United States Patent [19]

Ringermacher et al.

[11] Patent Number: 4,701,658

[45] Date of Patent: Oct. 20, 1987

[54] BROADBAND ACOUSTIC POINT-CONTACT TRANSDUCER

[75] Inventors: Harry I. Ringermacher, West Hartford; Richard S. Williams, Coventry, both of Conn.

[73] Assignee: United Technologies Corporation, Hartford, Conn.

[21] Appl. No.: 6,313

[22] Filed: Jan. 14, 1987

Related U.S. Application Data

[63] Continuation of Ser. No. 710,643, Mar. 11, 1985, abandoned.

[51] Int. Cl.$^4$ .......................................... H01L 41/08
[52] U.S. Cl. ................................. 310/334; 310/327; 310/336; 310/365; 310/369; 369/144
[58] Field of Search ............. 310/326, 327, 334–336, 310/367, 368, 369, 323, 329; 73/632, 642, 644; 369/130, 137, 144

[56] References Cited

U.S. PATENT DOCUMENTS

| | | | |
|---|---|---|---|
| 2,803,129 | 8/1957 | Bradfield | 310/327 X |
| 3,302,044 | 1/1967 | Lynnworth et al. | 310/336 X |
| 3,580,057 | 5/1971 | Seegmiller | 310/336 X |
| 3,794,866 | 2/1974 | McElroy et al. | 310/327 |
| 3,824,352 | 7/1974 | Adler | 369/144 X |
| 3,865,997 | 2/1975 | Halter | 369/144 |
| 3,950,660 | 4/1976 | McElroy | 310/336 |
| 4,061,934 | 12/1977 | Rowe | 310/369 X |
| 4,365,515 | 12/1982 | Abts | 310/335 X |
| 4,530,138 | 7/1985 | Ritter | 310/365 X |
| 4,587,848 | 5/1986 | Nakamura et al. | 310/336 X |
| 4,673,839 | 6/1987 | Veenendaal | 310/369 X |

FOREIGN PATENT DOCUMENTS 1086640 10/1967 United Kingdom ................. 310/327

*Primary Examiner*—Mark O. Budd
*Attorney, Agent, or Firm*—Peter R. Ruzek; Robert P. Sabath

[57] ABSTRACT

An acoustic transducer (10) with a pointed piezoelectric element (11) mounted on an electrically conductive damping mass (12), having a conductive tip (33), the damping mass (12) and conductive tip (33) being electrically connected to opposite terminals in a coaxial line (14). The conductive tip (33) has a convex wear member (35) for contact with a surface to be measured. In one version, the tip (33) is in contact with a flexible conductive sheet (17') for environmental protection.

8 Claims, 3 Drawing Figures

BROADBAND ACOUSTIC POINT-CONTACT TRANSDUCER

This is a request for filing a continuation application under 37 CFR 1.62 of prior pending application Ser. No. 710,643 filed on Mar. 11, 1985 now abandoned.

TECHNICAL FIELD

This invention is directed toward the technical field of new and improved acoustic tranducers, and more particularly toward the field of pointed or conical element point-contact acoustic tranducers.

BACKGROUND OF THE INVENTION

Traditionally, acoustic sensors employed for detecting sonic and ultrasonic emissions from selected material surfaces have used damped resonators to establish effective frequency range for operation.

The level of damping provided in such sensors has, however, generally been insufficient to enable an accurate level of broadband response indications completely covering a selected frequency range of primary interest, including, for example, the kilohertz and megahertz frequency domains.

Furthermore, prior designs previously employed have generally relied upon receipt of the acoustic signals over large contact areas by velocity sensitive detection elements. Such arrangements unfortunately grossly distort the received acoustic information.

It is accordingly an object of the invention to develop a compact, broadband point-contact acoustic transducer which minimizes contact area and enhances out of plane displacement sensitivity.

It is a further object of the invention to establish such a transducer, which does not require a coupling medium in order to detect displacement indications.

DISCLOSURE OF INVENTION

The point-contact acoustic transducer arrangement of the invention herein accordingly features a pointed or conical piezoelectric sensor element made of active piezoelectric material and having an improved transducer tip. The sensor element is mounted on a conductive damping mass and is conical or pointed to eliminate backward traveling high frequency ultrasonic waves.

According to the invention, the tip of the sensor element is convex and according to one version provides an electrical ground connection for the transducer arrangement. The high side electrical connection can in turn be provided from the electrically conductive damping mass. The tip of the sensor element extends beyond the level of the remainder of the transducer arrangement for contact with the acoustically active surface being measured.

According to one version of the invention, a flexible sheet of conductive material covers the receiving end of the transducer arrangement including the tip of the sensor element which protrudes downwardly therefrom, in effort to seal the transducer, thereby protecting it from adverse environmental and electrical influences. The tip of the sensor element is physically joined or connected to the sheet of conductive material.

Other features and advantages of the invention will be apparent from the specification and claims below and from the accompanying drawing which illustrates a preferred embodiment of the invention.

DETAILED DESCRIPTION OF A PREFERRED OR BEST MODE FOR CARRYING OUT THE INVENTION

Figure 1:
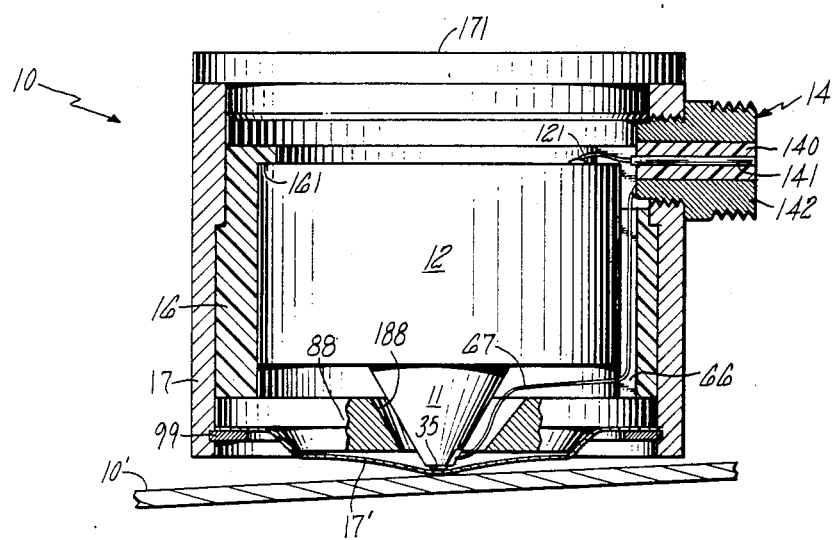
FIG. 1 is a side cross-section of the invented transducer, showing the conductive damping member and the pointed transducer tip protruding therefrom and extending toward the acoustically active surface to be measured.

FIG. 1 shows an acoustic transducer 10 including a pointed sensor element 11 for receiving acoustic signals from a surface 10' about to be measured for acoustic indications. The sensor element 11 may be directly in contact with an acoustically active surface 10' or indirectly in contact therewith through a flexible sheet of conductive material (17') as will be seen. The tip of the sensor element 11 is shown protruding from the transducer 10 toward surface 10'.

The sensor element 11 is preferably pointed or conical to prevent acoustic reflection back to the surface 10' being measured. The lower or receiving end of the sensor element 11 is oriented toward the detected surface 10'. By being pointed, the acoustic transducer 10 can effectively work even on relatively rough surfaces and need not be precisely aligned with the surface being measured.

The sensor element 11 is piezoelectric, which enables it to convert acoustic energy into an electrical signal reflecting the frequency of a disturbance applied to the measured surface 10'. The preferred piezoelectric material in this case is PZT-4. Other materials which are acoustically lossier, but which may work, though not as well, necessarily, are other lead zirconate titanates, lead metaniobate, or any one of a number of similar piezoelectric ceramics. These materials are first machined into the preferred conical shape and then electrically poled in a manner well-known in the art.

The preferred full conical shape herein is approximately 60 degrees from the viewpoint of the tip of the sensor element 11 with the base diameter being 6.00 mm, the height 5.00 mm, the diameter of the tip being 1.50 mm, the wear shoe being 1 mm wide and 0.10 mm thick.

The sensor element 11 is mounted by preferably silver epoxy bonding it, for example, on an electrically conductive damping mass 12, which in this case is preferably cylindrical and made of brass.

The conductive nature of the mass 12 permits it to carry the electrical signal produced in sensor element 11 to a coaxial cable connector 14 including inner and outer cnductors 141 and 142 respectively.

The damping mass 12 is suitably mounted as by press fitting for example within an insulative member 16. This insulative member 16 is preferably annular and cylindrical enabling it effectively to hold the cylindrical damping mass 12 without slippage in an axial direction.

Insulative member 16 includes an inner flange 161 at its upper rim acting as a stop to hold damping mass 12 in place. The insulative piece 16 is in turn held in an outer shielding case 17 preferably made of steel and capped with a top element 171 of the same material preferably to insure shielding from above.

Coaxial cable connector 14 threadedly extends through the steel case 17. Coaxial cable connector 14 further includes insulative material 140 effective for electrically isolating inner and outer conductors 141 and 142.

Figure 2:
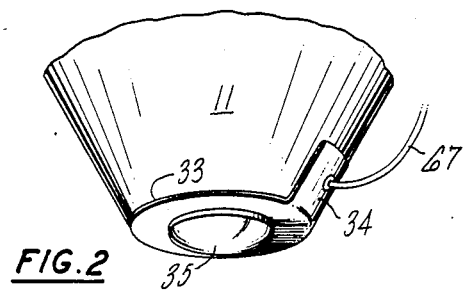
FIG. 2 is an isometric view of the transducer tip transversely from below.

As suggested in FIG. 2, a conductive overlay 33 is suitably applied onto the bottom end or tip of the sensor element 11. Conductive overlay 33 is essentially a metalic layer of silver, for example, fired onto the end of sensor element 11. This overlay 33 is preferably fashioned to include a tab 34 extending therefrom in an upward direction away from the surface 10' subject to measurement. The tab 34 is approximately ½ mm by ½ mm square, in order to insure that it is relatively small in area compared with the overall area of the tip 35.

Conductive overlay 33 is in turn further provided with a wear tip 35 to be discussed in detail below. As will be seen, the wear tip 35 is convex, which enables it to work effectively on rough surfaces without precise alignment thereupon.

Turning again to FIG. 1, insulative piece 16 defines a duct 66 permitting a preferably insulated lead or wire 67 to extend therethrough for electrical connection of overlay 33 with coaxial cable connector 14. In particular, according to a preferred version of the invention, lead or wire 67 connects tab 34 of overlay 33 to one or the other of conductors 141 and 142. FIG. 1 shows one version of the arrangement, namely tab 34 connected with outer conductor 142 of coaxial cable connector 14. Center conductor 141 of coaxial cable connector 14 is in turn connected with electric lead or wire 121 to damping mass 12.

Coaxial cable connector 14 is well adapted for handling radio frequency signals in view of the shielding effect of its outer conductor 142. This preserves the broadband range of signal frequencies provided by detector 10.

Wear tip 35 is, for example, a convex disc of a selected hardened silver/copper alloy soldered in place on overlay 33. Wear disk 35 is soldered into place to provide a convex, smooth bearing surface, ensuring effective point contact on any surface to be measured.

Outer shielding case 17 defines an opening in its underside, permitting sensor element 11 to extend toward an acoustically active surface 10' to be measured. Outer shielding case 17 further includes, for example, a top member 171 in effect for completing shielding operation from above.

Measurement can begin when sensing element 11 is in material contact, direct or indirect, with the active surface. No lubricant, solvent, gel, or other material needs to be applied to the surface measured to enable operation.

The reason for there not needing to be any lubricating medium, is that the tip 35 of the transducer extends or protrudes out of the body of the transducer 10 to make contact with the acoustically active surface 10' being measured. This tip 35 even bends flexible sheet 17', causing it to bulge downward toward surface 10'. This permits even relatively rough surfaces 10' to be measured.

For electric shielding purposes, a partial shielding member 88 is preferably mounted on the underside of outer conductive case 17 in contact therewith. Shielding member 88 in this case defines a center aperture 188 permitting the sensing element 11 to extend beyond the plane of the end of outer conductive case 17 for contact with the surface 10' to be measured. A locking ring 99 is used to secure the shielding piece 88 in case 17.

Transducer 11 may be used on just about any acoustically active material surface selected. To secure the tranducer 11 against the selected surface, mere taping of the transducer 11 into place on the surface to be measured is sufficient in many cases.

Figure 3:
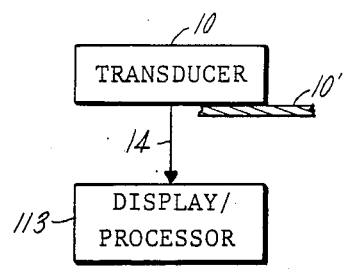
FIG. 3 is a simple block diagram of an arrangement including a single processor and display which can be employed in conjunction with the transducer.

In operation, coaxial lead 14 may extend to a display apparatus or processing means 113 as shown in FIG. 3. Such equipment is effective to analyze and present in suitable fashion the broadband signals obtained by setting the transducer 11 onto an acoustically active surface 10' to be measured.

This arrangement produces an extremely broad transducer frequency response range extending from at least fifty kilohertz to about 1.5 megahertz.

Others skilled in the art are likely to develop variations of the invention after reading this document. These will in all probability fall within the scope of the invention. Accordingly, reference to the claims which follow is urged, as these along definitively state the scope of the subject matter of this invention.

We claim:

1. A broadband acoustic transducer for detecting acoustic signals and producing electrical signals representative thereof, comprising piezoelectric means including a tip of a piezoelectric material converging toward a front region thereof that is at least indirectly in contact with an acoustically active surface to be measured during a measuring operation, electrically conductive mass means for rearwardly supporting said piezoelectric means, shield means for insulatively supporting said conductive mass means and said piezoelectric means, said tip extending beyond said shield means for said contact with said acoustically active surface, and electrical means for detecting electrical signals generated in said piezoelectric means in response to the activity of said acoustically active surface, including tab means at said front region of said tip for connection to ground with an electrical wire.

2. The transducer of claim 1, wherein said shield means defines an aperture for said grounding wire.

3. The transducer of claim 1, wherein said shielding means includes an annular insulative piece for holding said conductive mass means.

4. The transducer of claim 1, wherein said shield means includes a lower shielding piece defining a central aperture for permitting the throughward extension of said piezoelectric tip for said contact with said acoustically active surface.

5. The transducer of claim 1, further comprising a wear member on said front region of said tip for contact with said acoustically active surface.

6. The transducer of claim 5, wherein said wear member is convex.

7. The transducer of claim 1, wherein said shield means is effective for preventing axial slippage of the conductive mass within said shield means.

8. The transducer of claim 1, wherein said tab means is relatively small in area compared with the overall area of said piezoelectric tip.

* * * * *

UNITED STATES PATENT AND TRADEMARK OFFICE
CERTIFICATE OF CORRECTION

PATENT NO. : 4,701,658

DATED : October 20, 1987

INVENTOR(S) : Harry I. Ringermacher et al

It is certified that error appears in the above-identified patent and that said Letters Patent is hereby corrected as shown below:

Column 1, Line 61 "effort" should read "effect"

Column 2, Line 11 "single" should read "signal"

Column 2, Line 59 "cnductors" should read "conductors"

Signed and Sealed this

Thirteenth Day of September, 1988

Attest:

DONALD J. QUIGG

Attesting Officer

Commissioner of Patents and Trademarks